United States Patent
Athinarayanan et al.

(10) Patent No.: US 12,206,118 B1
(45) Date of Patent: Jan. 21, 2025

(54) METHOD OF FABRICATING CARBON QUANTUM DOTS USING CAMEL HAIR

(71) Applicant: KING SAUD UNIVERSITY, Riyadh (SA)

(72) Inventors: Jegan Athinarayanan, Riyadh (SA); Ali Abdullah Alshatwi, Riyadh (SA); Periasamy Vaiyapuri Suubarayan, Riyadh (SA); Taghreed Naser Almanaa, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/408,166

(22) Filed: Jan. 9, 2024

(51) Int. Cl.
*H01M 4/96* (2006.01)
*C01B 32/15* (2017.01)
*H01M 8/16* (2006.01)
*B82Y 30/00* (2011.01)
*B82Y 40/00* (2011.01)
*C02F 3/00* (2023.01)
*C02F 103/32* (2006.01)
*H01M 4/86* (2006.01)

(52) U.S. Cl.
CPC ............ *H01M 4/96* (2013.01); *C01B 32/15* (2017.08); *H01M 8/16* (2013.01); *B82Y 30/00* (2013.01); *B82Y 40/00* (2013.01); *C01P 2002/84* (2013.01); *C01P 2004/04* (2013.01); *C01P 2006/40* (2013.01); *C02F 3/005* (2013.01); *C02F 2103/327* (2013.01); *H01M 2004/8689* (2013.01)

(58) Field of Classification Search
CPC ................ H01M 4/96; H01M 8/16; H01M 2004/8689; C01B 32/15; B82Y 30/00; B82Y 40/00; C01P 2002/84; C01P 2004/04; C01P 2006/40; C02F 3/005; C02F 2103/327
See application file for complete search history.

(56) References Cited

U.S. PATENT DOCUMENTS

| | | | |
|---|---|---|---|
| 2015/0218001 A1* | 8/2015 | Wang ................. | B01J 35/23 977/932 |
| 2024/0069027 A1* | 2/2024 | Li ..................... | C09K 11/65 |

OTHER PUBLICATIONS

Loukanov, A. et al. "Carbon nanodots chelated with metal ions as efficient electrocatalysts for enhancing performance of microbial fuel cell based on sulfate reducing bacteria," Colloids and Surfaces A 574 pp. 52-61 (2019) (Year: 2019).*

(Continued)

*Primary Examiner* — Mark Kopec
*Assistant Examiner* — Jaison P Thomas
(74) *Attorney, Agent, or Firm* — Nath, Goldberg & Meyer; Joshua B. Goldberg

(57) ABSTRACT

A method of fabricating carbon quantum dots (CQDs) from camel hair using a bio-char synthetic approach. In an embodiment, the method comprises adding dried camel hair to water to provide a mixture; subjecting the mixture to a hydrothermal treatment in a hydrothermal reactor at a temperature of about 150° C. to about 250° C. for a period of time ranging from about 8 hours to about 13 hours to provide a product including camel-hair derived carbon quantum dots. The camel-hair derived carbon quantum dots can be an effective electrocatalyst in a microbial fuel cell for bioelectricity generation.

11 Claims, 4 Drawing Sheets

(56) References Cited

OTHER PUBLICATIONS

Al-Saned, A.J. et al., "Microbial fuel cells (MFC) in the treatment of dairy wastewater," 2021 IOP Conf. Ser.: Mater. Sci. Eng. 1067012073 (2021) (Year: 2021).*

Wang et al., "N, S-Doped Carbon Dots Prepared by Peanut Protein Isolates and Cysteamine as Highly Sensitive Fluorescent Sensors for Fe2+, Fe3+ and Lactoferrin," Polymers (Basel). Jan. 2023; 15(1): 216, 2023.

Guo et al., Scientific Reports vol. 6, Article No. 35795, 2016.

Landa et al., iScience. 25(2): 103816, 2022.

* cited by examiner

METHOD OF FABRICATING CARBON QUANTUM DOTS USING CAMEL HAIR

BACKGROUND

1. Field

The present disclosure relates to fabrication of N- and S-doped carbon quantum dots and, particularly, to fabrication of N- and S-doped carbon quantum dots using camel hair as green bioprecursors.

2. Description of the Related Art

Carbon quantum dots (CQDs) have received attention due to their high fluorescence, electrical, catalytic, photobleaching resistance, biocompatible, and antioxidant properties. They are utilized for bio-imaging of cells, sensing metal ions and biomolecules, photocatalysis, nanomedicine, and energy conversions. In 2004, unexpectedly, CQDs were discovered during single-walled carbon nanotubes fabrication. A variety of methods have been employed to prepare the CQDs, such as electrochemical, laser ablation, solvothermal, hydrothermal, and microwave approaches. Additionally, different kinds of synthetic and natural precursors have been utilized. For instance, amino acids, sugars, and citric acid have been used for CQDs preparation.

Renewable and naturally available materials-based precursors have received great attention because of their availability, renewability, sustainability, eco-friendliness, and inexpensiveness. Naturally occurring substances are particularly attractive because of their numerous functional groups. Earlier studies have demonstrated that fish scales had been utilized as a bioprecursor to fabricate CQDs and hydroxyapatite simultaneously. Moreover, palmyra palm leaf and date-palm leaf stalk were exploited for fluorescent and biocompatible CQDs preparation.

In recent years, renewable and green energy has received interest due to fossil fuel depletion and environmental pollution. A microbial fuel cell (MFC) is a promising green technology producing bioelectricity from renewable and sustainable resources. The MFC is a device that converts chemical energy into electrical energy using microorganisms. Generally, the MFC includes an anodic chamber and a cathodic chamber. In an anodic chamber, an organic substance is oxidized/degraded to produce protons and electrons by microbes under anaerobic conditions. The electrons and protons move from anode to cathode through the external circuit and proton exchange membrane, respectively, generating bioelectricity. Usually, organic substances oxidized at the anode are associated with oxygen reduction at the cathode. Previously, various materials were employed as oxygen-reducing catalysts at the cathode, including persulfate, ferricyanide, permanganate, nitrate, and dye molecules. However, these materials have some disadvantages. Thus, an efficient catalyst for an MFC cathode is needed.

Camels belong to the Camelidae family. Camels can be mainly used for milk, meat, natural fiber production, and transport in deserts. Camel hair has been utilized in textile industries for cloth-making. Camel hair has excellent elasticity, strength, durability, and low conductivity. Also, it has a hierarchical structure, with cortical cells covered by a protective layer of interior cortex and cuticle cells. The cortical cells have an intricate inner arrangement that includes twisted molecular chain and helical coils, microfibrils, matrix, and macro-fibrils. Camel hair is mainly composed of fibrous keratin protein. A previous study demonstrated that camel hair-derived keratin comprises different amino acids, including sulfur-containing amino acids. Interestingly, 7.9% and 0.4% of cysteine and methionine are present in camel hair, respectively.

Thus, a method of fabricating carbon quantum dots, solving the aforementioned problems is desired.

SUMMARY

In an embodiment, the present subject matter relates to a method of fabricating carbon quantum dots, comprising adding dried camel hair to water to provide a mixture; and subjecting the mixture to hydrothermal treatment in a hydrothermal reactor at a temperature of about 150° C. to about 250° C. for a period of time ranging from about 8 hours to about 13 hours to provide a product including carbon quantum dots.

These and other features of the present subject matter will become readily apparent upon further review of the following specification and drawings.

DETAILED DESCRIPTION OF THE PREFERRED EMBODIMENTS

Figure 1:
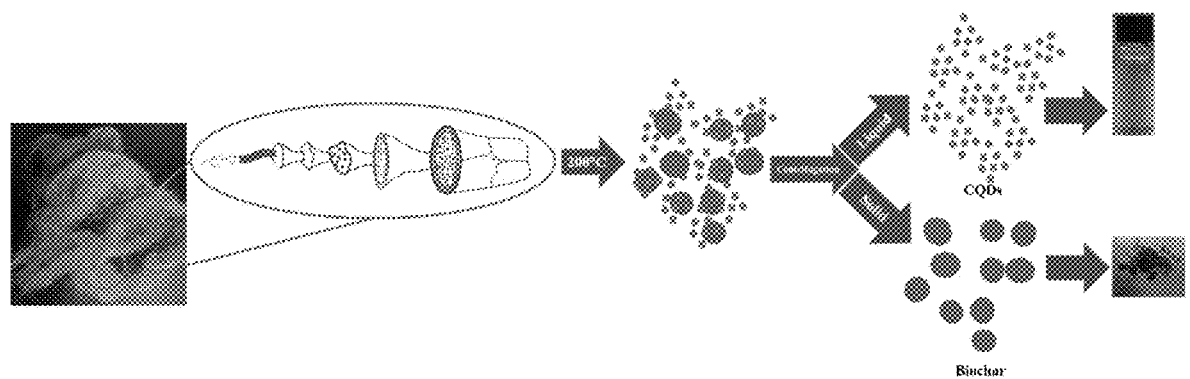
FIG. 1 is a schematic representation of camel hair-derived CQDs fabrication.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a method of fabricating carbon quantum dots (CQDs) from camel hair using a bio-char synthetic approach. In an embodiment, the method comprises adding dried camel hair to water to provide a mixture; and subjecting the mixture to a hydrothermal treatment in a hydrothermal reactor at a temperature of about 150° C. to about 250° C. for a period of time ranging from about 8 hours to about 13 hours to provide a product including camel-hair derived carbon quantum dots. In an embodiment, the camel-hair derived carbon quantum dots can include N- and S-doped CQDs. As described herein, the camel-hair derived carbon quantum dots can be an effective electrocatalyst in a microbial fuel cell for bioelectricity generation.

An exemplary method for preparing the camel hair-derived CQDs is shown in FIG. 1. Camel hair encompasses three main morphological constituents, an external cuticle, a cortex, and medulla. The cuticle cells are organized as a shielding sheath on the cortex. The interior of the cortex comprises macro-fibril, matrix, and micro-fibril, which provides mechanical strength of the fibers. Camel hair constitutes an amorphous matrix fibril linked with a non-consistent crystalline phase. Camel hair is mainly composed of fibrous structural protein keratin that has a 3-D (three-dimensional) structure. Mostly, it includes amino acids linked by peptide bonds. The camel hair keratin consists of sulfur-containing amino acids (7.9% of cysteine and 0.4% of methionine). When the camel hair is subjected to hydrothermal treatment, the high temperatures and pressurized conditions disintegrates the keratin structure into small molecules. Then, the small molecules are transformed into CQDs. After hydrothermal treatment, the resulting product or mixture can be centrifuged to separate the CQDs from biochar in the mixture. The CQDs can be in the form of a liquid having a golden or yellow color and the biochar can be a solid fraction having a black color. The CQDs can be isolated from the biochar by filtering, e.g., dialysis.

In one embodiment, the hydrothermal treatment can include carbonizing the mixture in the hydrothermal reactor at a temperature of about 200° C. for about 12 hours. In another embodiment, the hydrothermal treatment can include carbonizing the mixture in the hydrothermal reactor at a temperature of about 180° C. for about 10 hours.

The camel hair-derived CQDs can have a golden/yellow color in daylight and exhibit a bright blue color fluorescence under UV (ultraviolet) light irradiation at around 365 nm. The UV-Vis spectra of CQDs show the absorption peak at 274 nm and 329 nm, corresponding to $\pi \rightarrow \pi^*$ transition of the C=C bond and n-$\pi^*$ transition of C=O, respectively. The photoluminescence (PL) properties of the camel hair-derived CQDs indicate that the camel hair-derived CQDs exhibit excitation-dependent emission, which can be attributed to the existence of diverse sizes and emissive traps on the surface of the nanostructures. Accordingly, it is believed that the excitation-dependent emission feature of camel hair-derived CQDs can be applicable for multi-color bio-imaging studies.

The camel hair-derived CQDs possess a graphite-like structure. The camel hair-derived CQDs are well-dispersed, with different sizes, and are spherical in shape. The camel hair-derived CQDs have an average particle size ranging from about 5 nm to about 20 nm in diameter. For example, the camel hair-derived CQDs have an average particle size that is 95 nm in diameter.

An embodiment of the present teachings is directed to a microbial fuel cell including an anode compartment and a cathode compartment separated by a proton exchange membrane. The anode compartment can include an organic substance, a bacterial source, and an anode. The cathode compartment can include a cathode and an electrocatalyst for oxygen reduction at the cathode. In an embodiment, the anode in the anode compartment can include a carbon cloth and the cathode compartment can include a carbon cloth that includes the camel hair-derived carbon quantum dots as an electrocatalyst. In an embodiment, the organic substance comprises dairy industrial effluent and the bacterial source comprises anaerobic sludge.

As described herein, the camel-hair derived CQDs can be an effective electrocatalyst in a microbial fuel cell for bioelectricity generation.

The present subject matter can be better understood by referring to the following examples.

EXAMPLES

Example 1

Synthesis of N- and S-doped CQDs

Camel's hair was collected from a local farm in Riyadh, Kingdom of Saudi Arabia. The camel's hair was washed with water to remove impurities and dried at 45° C. About 1 g of dried camel hair was added to 200 mL of distilled water to provide a mixture. The mixture was transferred to a hydrothermal reactor and maintained at 180° C. for 10 hours. After hydrothermal treatment, the obtained product was filtered using a 0.22 µM filter. Next, the bright yellow color liquid was purified through dialysis. The CQDs, yellowish in color, were subjected to further studies.

The optical behavior of the camel hair-derived CQDs was studied using ultraviolet-visible spectroscopy and fluorescent spectroscopy. The X-ray diffraction (XRD) pattern of the samples was investigated using an X-ray diffractometer (Bruker diffractometer, Model D8 Advance) with Cu Kα radiation and 100 mA current and 40 kV. The structural properties of the CQDs were observed using transmission electron microscopy (TEM) (JEOL, Tokyo, Japan) with an accelerating voltage of 100 kV. The average particle size of the CQDs was analyzed using dynamic light scattering (Zetasizer 90S, Malvern).

Figure 2:
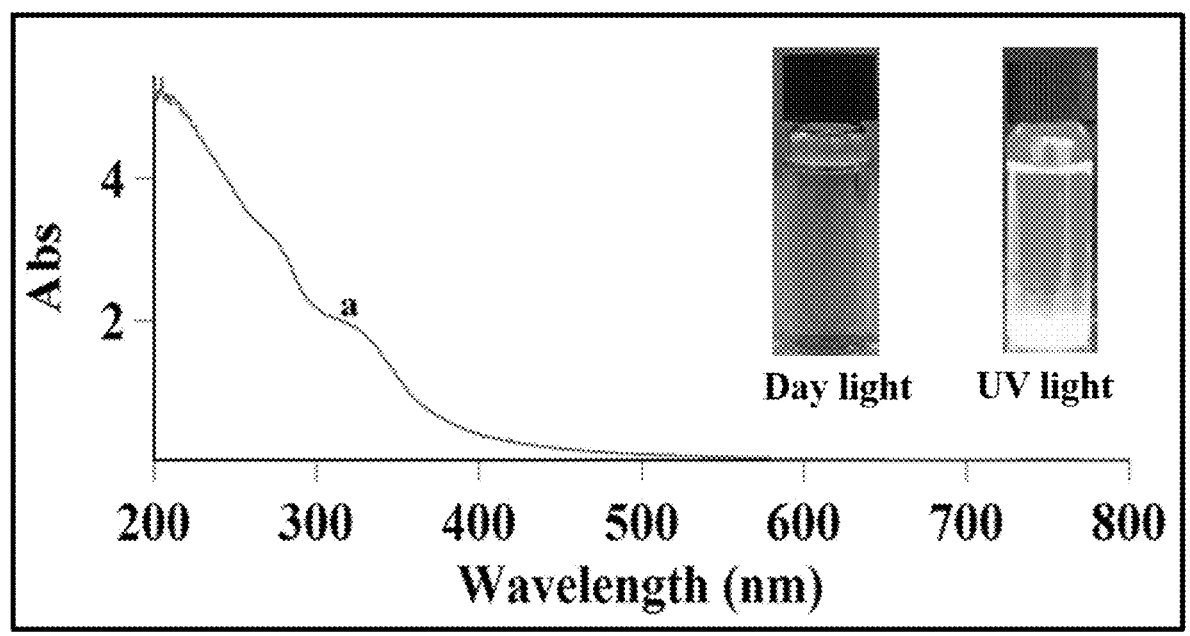
FIG. 2 shows UV-Visible spectra of camel hair-derived CQDs.

The digital photograph and UV-Vis spectra of the camel-hair derived CQDs are shown in FIG. 2. The camel hair-derived CQDs' optical features were investigated. The camel hair-derived CQDs have golden yellow color in daylight and bright blue color fluorescence under UV (ultraviolet) light irradiation with 365 nm. Bright blue fluorescence was observed with the naked eye (FIG. 2). The UV-Vis spectra of CQDs show an absorption peak at 274 nm and 329 nm, corresponding to $\pi \rightarrow \pi^*$ transition of the C=C bond and n-$\pi^*$ transition of C=O, respectively.

The photoluminescence (PL) properties of camel hair-derived CQDs were studied. The obtained CQDs wavelength of excitation increased progressively from 280 to 520 nm, while the emission peak shifted to a longer wavelength. The PL study results suggested that camel hair-derived CQDs show excitation-dependent emission, attributed to the existence of diverse size and emissive traps on the surface of the nanostructures. These results closely agreed with previous studies. The excitation-dependent emission feature of camel hair-derived CQDs can be applicable for multi-color bio-imaging studies.

Figures 3A, 3B:
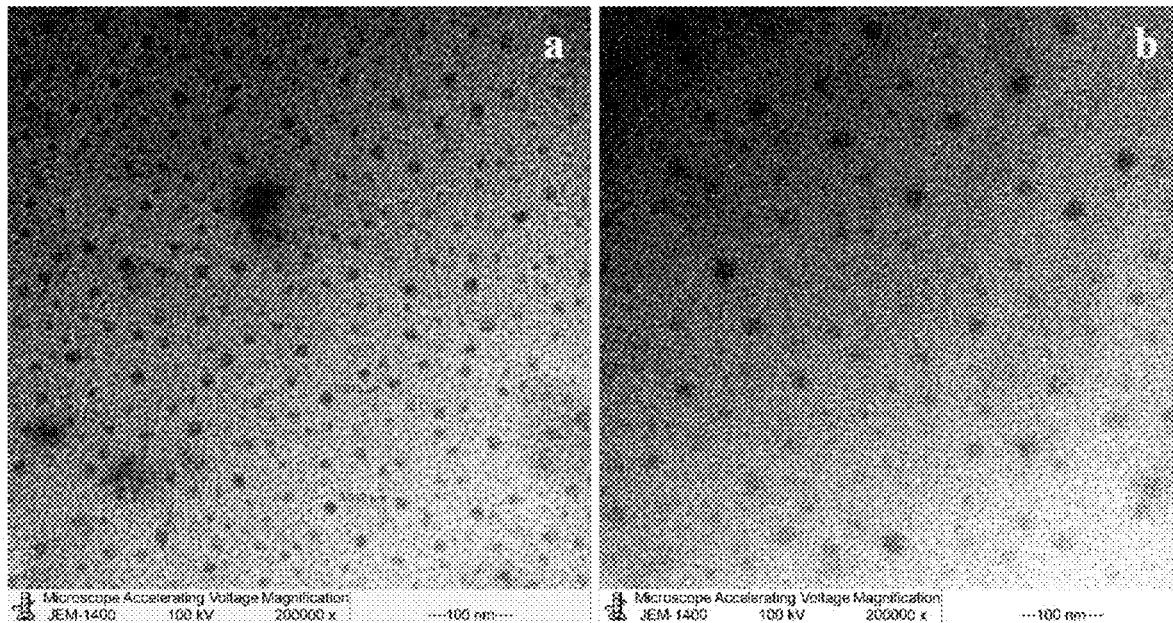
FIGS. 3A-3B depict transmission electron microscopic (TEM) images of the camel hair-derived CQDs.
Figure 4:
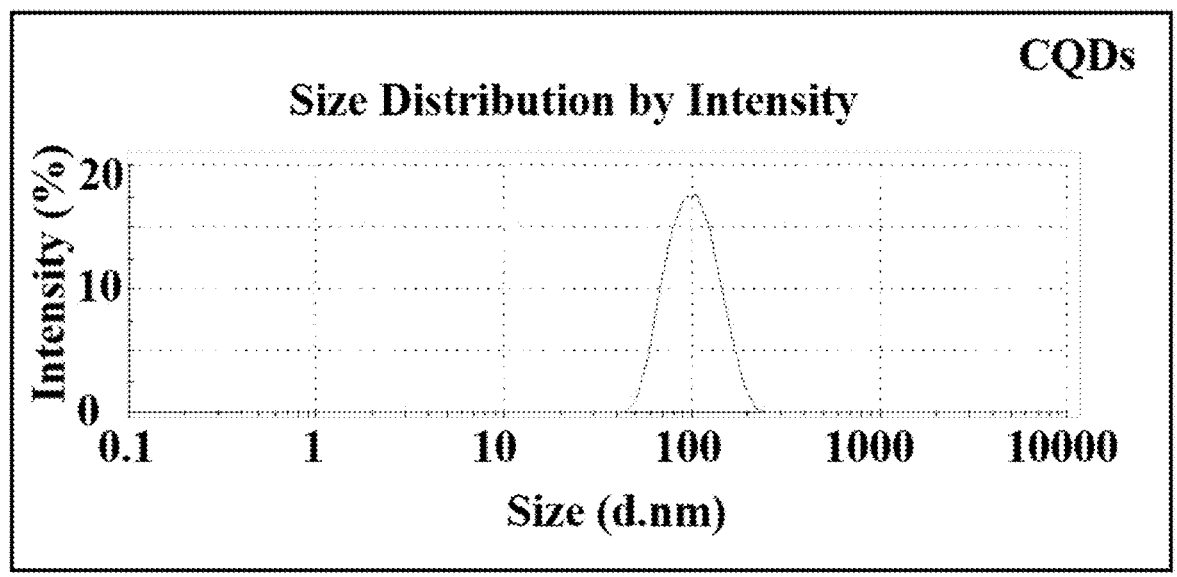
FIG. 4 is a graph showing the particle size distribution of camel hair-derived CQDs.

The crystal structure of CQDs was investigated using an X-ray diffractometer (XRD). The camel hair-derived CQDs show a broad peak of around 2θ value of 24.3, responsible for the graphitic carbon (002) plane. The result attributed that CQDs possess a graphite-like structure. The structural and morphological features of the camel hair-derived CQDs were investigated using transmission electron microscopy. The TEM images of camel hair derived CQDs is shown in FIGS. 3A and 3B. These results revealed well dispersed, and different sized CQDs, with sizes ranging from about 5 nm to about 20 nm and spherical shapes. Also, we have analyzed the average particles size distribution of CQDs, which is shown in FIG. 4. The results indicate that the average particle size of camel hair-derived CQDs is 95 nm in diameter. These results agreed with the TEM analyses.

Example 2

Evaluation of Cytotoxicity

The cytotoxic effect of camel hair-derived CQDs was assessed using FaDu cells as an in vitro model. Viability was assessed adopting an MTT (3-(4,5-dimethylthiazol-2-yl)-2, 5-diphenyltetrazolium bromide) assay. The cells were plated at a density of 10,000 cells per well in 96 well plates. After leaving overnight, the cells were treated with various concentrations of CQDs for 24 hours and 48 hours. After incubation, MTT dye (5 mg/mL) of 20 µL was added in each well. After that, the plates were kept in the dark for 6 hours. Next, the media was removed carefully, and the purple color pellet was dissolved by dimethyl sulfoxide. Subsequently, the plate was read using a microplate reader (Glomax).

Figure 5:
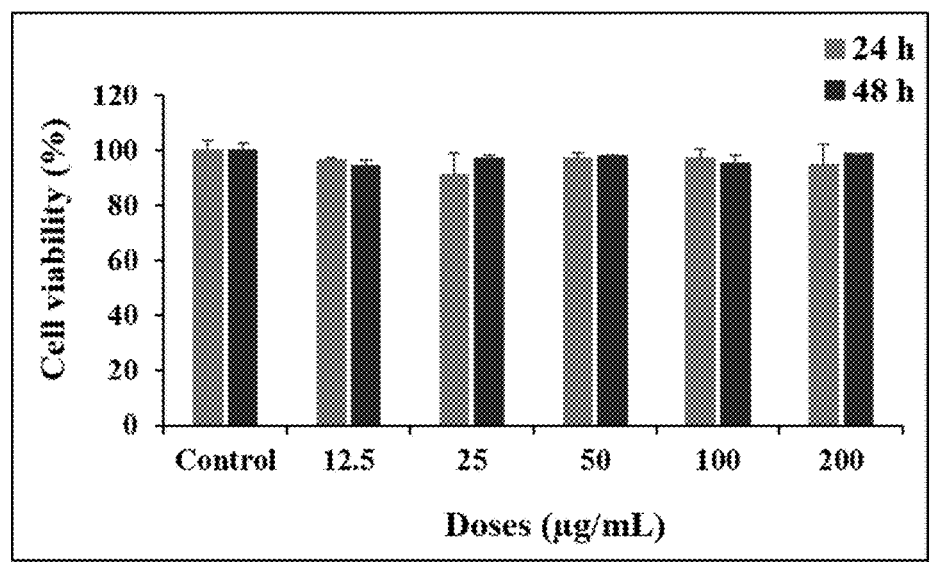
FIG. 5 is a graph showing the influence of different concentrations of camel hair-derived CQDs on cell viability of FaDu cells after 24 hours and 48 hours exposure.
Figure 6:
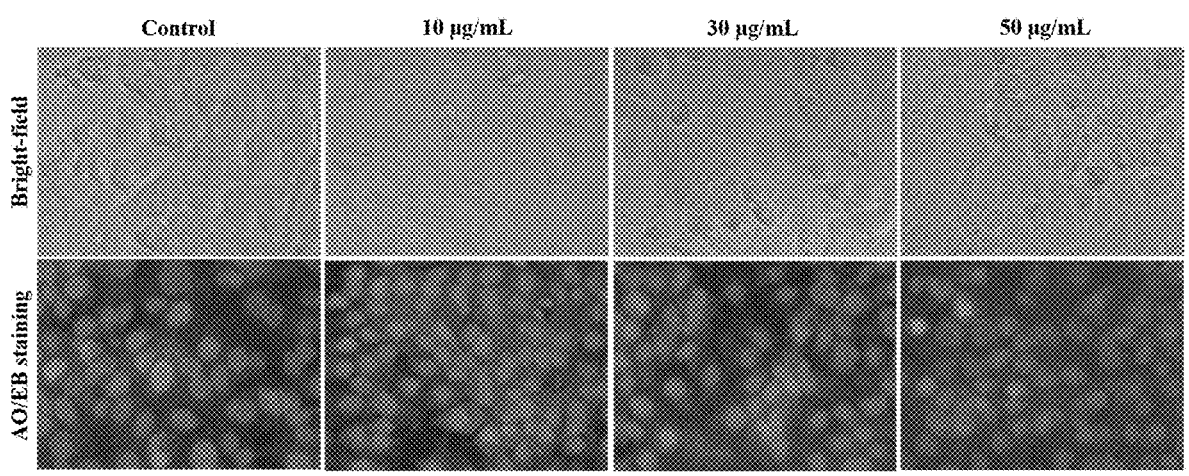
FIG. 6 is a table showing open circuit voltage output of the MFC using dairy industrial effluent as feedstock.

The camel hair-derived CQDs' influence on cell viability was assessed using FaDu cells as an in vitro model. These synthesized nanostructured materials did not alter the FaDu cells' viability up to 200 µg/mL (FIG. 5). However, the cell viability was not reduced tremendously, even at a high dose. The results indicate that synthesized CQDs are cytocompatible and non-toxic. Further, dual staining (AO/EB) was assessed for cell viability or death differentiation under a fluorescent microscope. Green, fluorescent cells were observed after treatment of CQDs (FIG. 6). These results revealed that nanostructures do not induce cell death up to 100 µg/mL.

Example 3

Nuclear Morphology Analysis

The CQD's effect on the nuclear organization of FaDu cells was analyzed. Acridine orange/ethidium bromide dye was used for nuclear staining of cells after CQDs treatment. The cells were grown in 12 well plates; after 80-90% confluence. The cells were exposed to different concentrations of camel-derived CQDs for 24 and 48 h. After incubation, the cells were washed with phosphate buffer saline and stained with AO/EB dual stain. After staining, the cells were observed under fluorescence microscopy.

Example 4

Electrochemical Analyses

About 5 mg of N- and S-doped CQDs was mixed with Nafion (5 Wt %). Before electrode modification, the GC electrode was polished with alumina slurry (0.05 micron). The N- and S-doped CQDs ink was homogeneously formulated by dispersing 5 mg of CQDs into 2 mL of 24% of isopropyl alcohol with 25 µL Nafion (5 wt %). After that, this mixture was kept in an ultrasonication process for 15 minutes. Then, 3 µL of the CQDs ink was carefully dropped on the GC electrode and dried. An ultrapure $N_2$ or $O_2$ gas was purged in a phosphate buffer solution for 30 min to achieve the saturation condition. Electrochemical measurements were performed using an Autolab potentiostat workstation (Metrohm) with a three-electrode configuration using Pt wire (counter electrode) and Ag/AgCl (Reference electrode) and modified GC as the working electrode.

Example 5

Evaluation of Microbial Fuel Cell Performance

Two identically similar MFCs were fabricated using different cathode catalyst materials. Each of the dual-chambered MFCs included an acrylic glass tube that contained an anode compartment (anode: carbon cloth) and a cathode compartment separated by a proton exchange membrane. The cathode of a first MFC ("modified MFC") included a modified carbon cloth (with the camel hair-derived CQDs thereon) and the cathode of second MFC ("unmodified MFC") included an unmodified carbon cloth (without the camel hair-derived CQDs). The electrodes were connected with titanium wire. In the anode compartment of both MFCs, dairy industrial effluent and anaerobic sludge were used as feedstock and bacterial sources, respectively. The camel hair-derived CQDs were loaded on carbon cloth and employed as a cathode in the first MFC. Phosphate buffer saline was filled in the cathode compartment. The MFCs were connected with a data acquisition system (DAQ) and the open-circuit voltage was recorded. The polarization curve was procured by changing the external resistance from 51K-100Ω.

Figure 7:
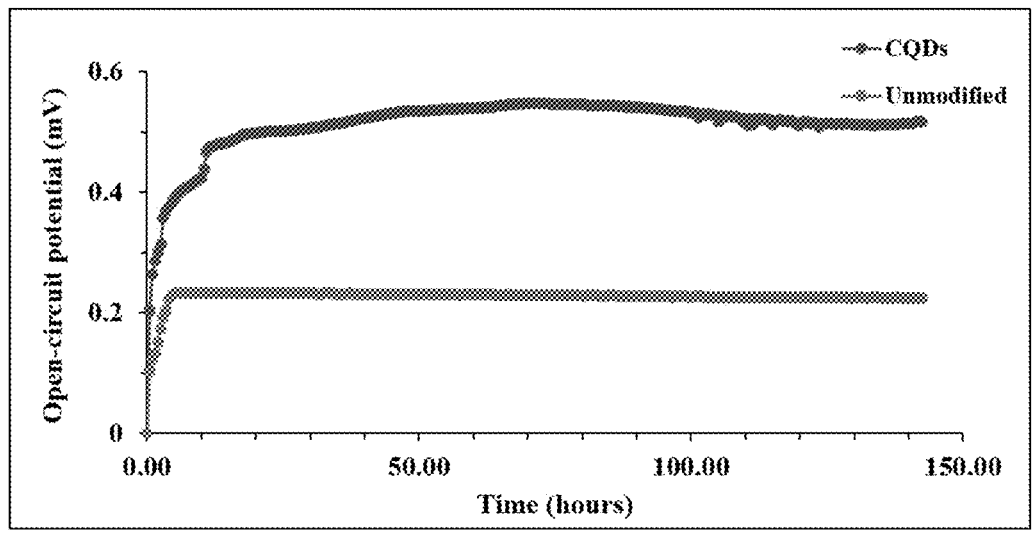
FIG. 7 is a graph showing the open circuit voltage output of the MFC using dairy industrial effluent as feedstock.

The open-circuit voltage (OCV) vs. time is shown in FIG. 7. The cell voltage gradually increased in the initial operation. After 10 hours, the cell voltage was increased until a stable and steady level was attained. The MFC including the cathode modified with camel hair-derived CQDs produced a higher bioelectricity than the unmodified cathode MFC. The modified and unmodified MFCs generate a maximum open-circuit voltage of 547 mV and 236 mV, respectively. The modified MFC performance is approximately 50% higher than unmodified MFC.

Figure 8:
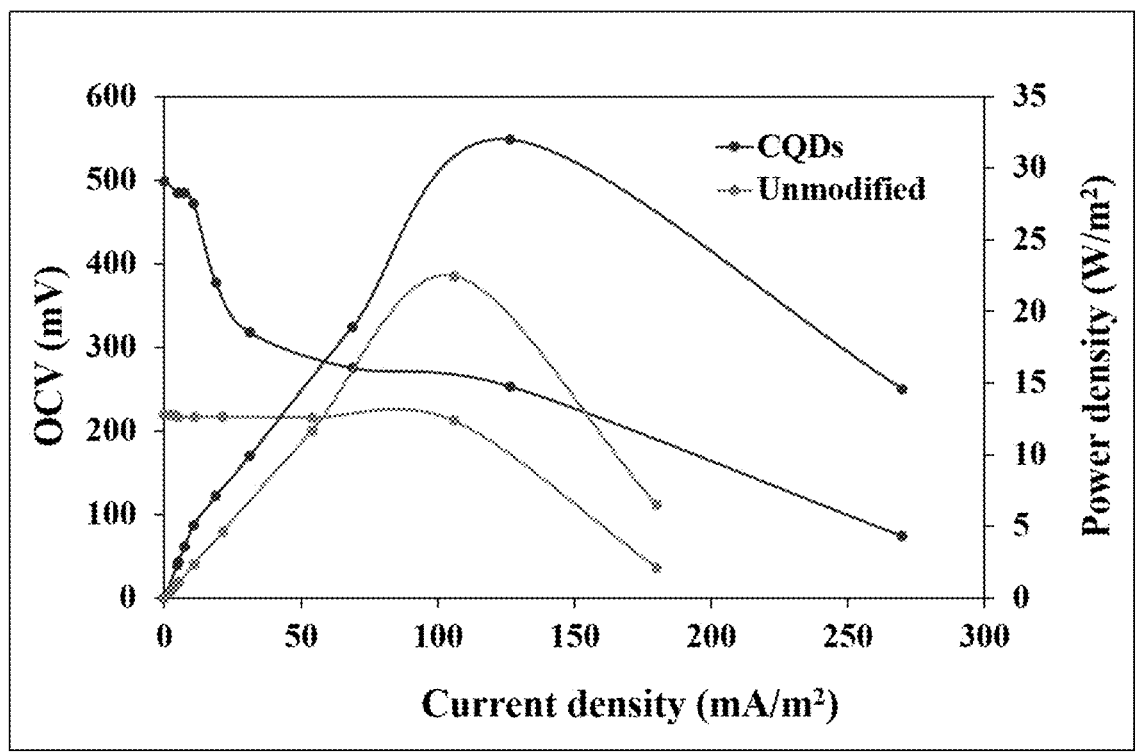
FIG. 8 is a graph showing polarization curves of the MFC using dairy industrial effluent as feedstock.

The MFCs were connected with external resistance, and a polarization curve was achieved. The power density and polarization curve are shown in FIG. 8. The modified MFC can generate a maximum power density of 32.004 W/m$^2$, higher than unmodified MFC (22.47 W/m$^2$). When compared with unmodified MFC performance, modified MFC performance is outstanding and high. These results suggest that the camel hair-derived CQDs enhance oxygen reduction in the cathode compartment and improve bioelectricity generation from dairy industrial effluent. Also, the camel hair-derived CQDs are a low-cost, sustainable, eco-friendly, non-toxic, and biocompatible material that can be highly applicable for biomedical and wastewater treatment applications.

It is to be understood that the method of fabricating carbon quantum dots using camel hair is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of fabricating carbon quantum dots, comprising:
    adding dried camel hair to water to provide a mixture; and
    subjecting the mixture to hydrothermal treatment in a hydrothermal reactor at a temperature of about 150° C. to about 250° C. for a period of time ranging from about 8 hours to about 13 hours to provide a product including carbon quantum dots.

2. The method of claim 1, wherein the mixture is subjected to the hydrothermal treatment in the hydrothermal reactor at a temperature of about 180° C. for about 10 hours.

3. The method of claim 1, wherein the mixture is subjected to the hydrothermal treatment in the hydrothermal reactor at a temperature of about 200° C. for about 12 hours.

4. The method of claim 1, further comprising isolating the carbon quantum dots from the product.

5. The method of claim 1, wherein the carbon quantum dots have an average particle size ranging from about 5 nm to about 20 nm in diameter.

6. Carbon quantum dots prepared according to the method of claim 1; wherein the carbon quantum dots have an average particle size of 95 nm in diameter and fluoresce blue light when irradiated with 365 nm ultraviolet light.

7. A microbial fuel cell, comprising:
    an anode compartment including an organic substance, a bacterial source, and an anode;
    a cathode compartment including a cathode and an electrocatalyst including the carbon quantum dots of claim 6.

8. The microbial fuel cell of claim 7, wherein the organic substance comprises dairy industrial effluent.

9. The microbial fuel cell of claim 7, wherein the bacterial source comprises anaerobic sludge.

10. The carbon quantum dots of claim 6, wherein the carbon quantum dots comprise N- and S-doped carbon quantum dots.

11. The method of claim 1, wherein the carbon quantum dots comprise N- and S-doped carbon quantum dots.

* * * * *